(No Model.)
T. G. HUNTER.
PROCESS OF REMOVING TIN FROM TIN SCRAP, &c.
No. 511,846. Patented Jan. 2, 1894.
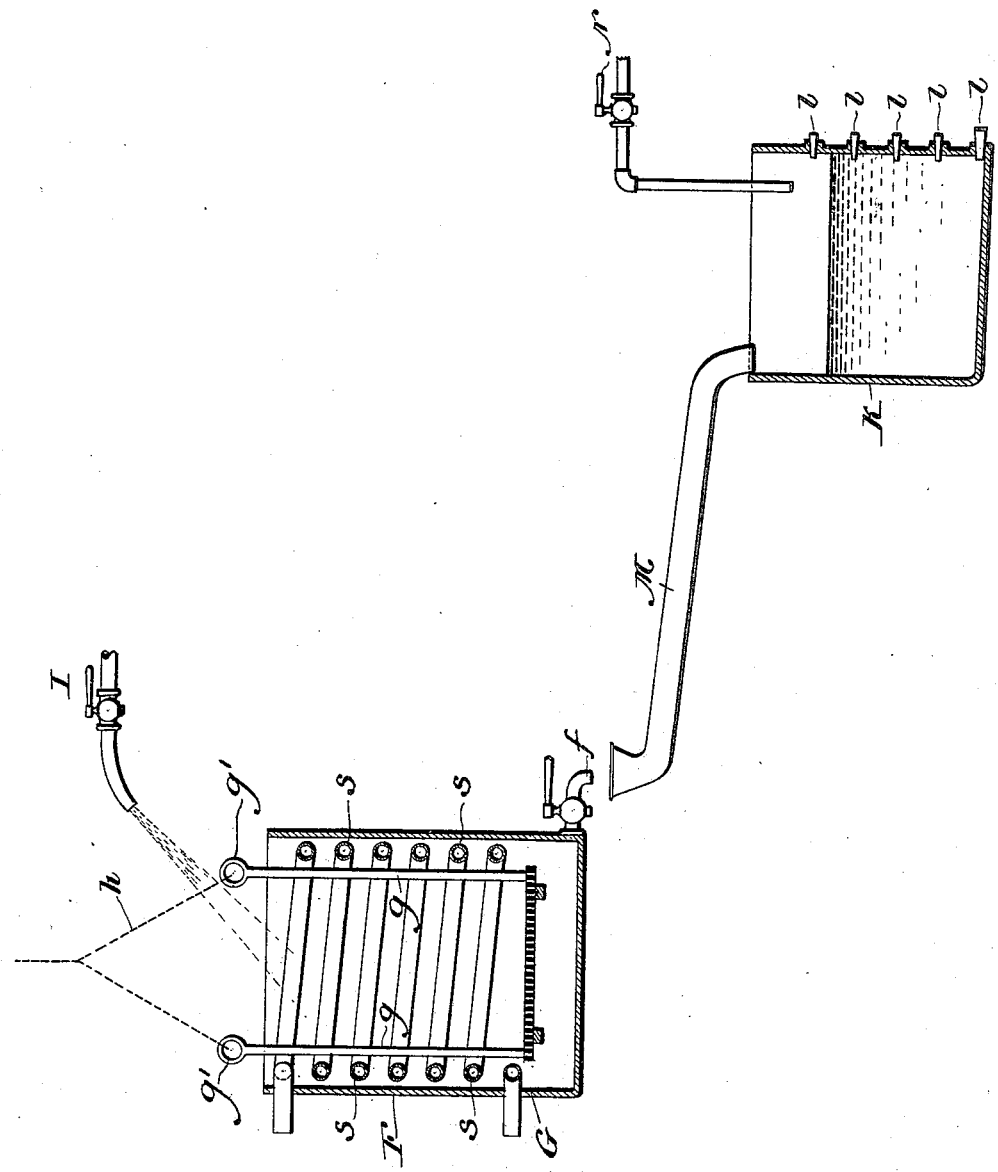

UNITED STATES PATENT OFFICE.

THOMAS G. HUNTER, OF PHILADELPHIA, PENNSYLVANIA.

PROCESS OF REMOVING TIN FROM TIN-SCRAP, &c.

SPECIFICATION forming part of Letters Patent No. 511,846, dated January 2, 1894.

Application filed March 25, 1893. Serial No. 467,563. (No specimens.)

*To all whom it may concern:*

Be it known that I, THOMAS G. HUNTER, of the city of Philadelphia and State of Pennsylvania, have invented a certain new and useful Process of Removing Tin from Tin-Scrap, &c., of which the following is a specification.

My invention has for its object the utilization of tin scrap by effecting the separation of the coating of tin from the iron of which the sheet is made by a process which may be carried on economically and will result in several different products of a commercial value.

In the accompanying drawing I have illustrated one form of apparatus by which my invention may be carried into effect, although it will be understood that any other suitable apparatus may be employed, my invention residing in the process described.

In this drawing F represents a suitable tank, preferably of wood, having an open top and provided at its lower end with a valved discharge, *f*. At a short distance above the bottom of the tank is a basket or grate, G, having vertical side bars, *g*, terminating at a point above the top of the tank in eyes, *g'*, to which hoisting chains, *h*, may be attached to remove the grate from the tank, when necessary. The grate, G, and bars, *g*, are preferably constructed of gun metal or metal which will not be acted upon by the sulphate. Above the tank is a valved water pipe, I, through which water is supplied in the flushing operation hereinafter described. At a point below the tank, F, is a suitable tank, K, having an open upper end and at various levels on one or more sides are tap holes, *l*, through which the contents of the tank may be discharged, and this tank is adapted to receive the contents of the tank, F, which, when discharged, flow through a conducting pipe or trough, M, to the tank, K. At a suitable point above the tank, K, is a valved water supply pipe, N, by which water is supplied for cleansing purposes.

In carrying out my said process, I proceed to place within the tank, F, a supply of so called "scrap tin" consisting of sheet iron having on each side a thin coating of tin, the scrap resting upon the grate and so leaving a space between the tin and the bottom of the tank. I then pour into the tank sulphate of copper in solution, the sulphuric acid radical in which, having a greater affinity for tin than for the copper, will combine with the tin and form sulphate of tin, precipitating metallic copper, which falls beneath the grate, G, to the bottom of the tank. After a time the tin coating is entirely combined with the sulphate and held in solution forming sulphate of tin, leaving the scrap iron in a pure state. The sulphuric acid radical of the tin sulphate so formed having a greater affinity for the iron immediately combines with the latter, forming sulphate of iron, precipitating metallic tin. The action of the sulphate on the iron is checked as soon as it takes up all the iron it can hold in solution, forming sulphate of iron. When all the tin has been precipitated the sulphate of iron with the precipitate of metallic tin and copper is drawn off from the tank, F, through the trough or pipe, M, to the tank, K. By subsequently flooding the tank, F, with water all the remaining particles of tin are washed to the bottom of the tank, F, whence it is drawn off, as before, to the tank, K. The grate, G, which may, if desired, be provided with sides to form a cage or basket, is then removed by the hoisting ropes or chains, *h*, and the pure scrap iron removed.

The mixture in the tank, K, consists of metallic copper, metallic tin, sulphate of iron diluted to a greater or less extent by the flushing water, and small quantities of minor impurities, such as lead, bismuth and phosphorus, which products and by-products may be utilized in any way known to the arts, the sulphate of iron being useful in dyeing and the copper and tin may be fused as an alloy, or separated by any process, and the scrap iron melted for use in the arts.

In the drawing I have shown steam supply pipes, *s*, surrounding the cage or basket in which the tin scrap is contained, so that, if necessary, heat may be used to facilitate the operation, the said pipes being composed of any metal which the sulphate will not attack.

I am aware that the use of an acidulated salt has heretofore been known for forming sulphate of tin from tin scrap, sheet zinc being subsequently employed to precipitate the tin; and I do not claim such as my invention.

Having thus described my invention, what I claim, and desire to secure by Letters Patent, is—

1. The herein described process of treating "tin scrap" consisting in subjecting the tin scrap to the action of a neutral solution of sulphate of copper and permitting such action to continue until the copper and tin have been precipitated in metallic form.

2. A process of treating "tin scrap," said process consisting in subjecting the tin scrap to the action of a neutral solution of sulphate of copper, permitting such action to continue until the copper and tin have been precipitated and sulphate of iron formed, then removing the precipitate with the sulphate of iron, flushing the remaining iron and finally removing said iron.

In witness whereof I have hereunto set my hand this 24th day of March, A. D. 1893.

THOMAS G. HUNTER.

Witnesses:
H. GORDON McCOUCH,
HORACE PETTIT.